US009122494B2

(12) United States Patent
Yang et al.

(10) Patent No.: US 9,122,494 B2
(45) Date of Patent: Sep. 1, 2015

(54) METHOD AND APPARATUS FOR CODE SIZE REDUCTION

(71) Applicant: NATIONAL TSING HUA UNIVERSITY, Hsinchu (TW)

(72) Inventors: Kun Hua Yang, Taichung (TW); Shao Chung Wang, Hsinchu (TW); Jenq Kuen Lee, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 335 days.

(21) Appl. No.: 13/894,694

(22) Filed: May 15, 2013

(65) Prior Publication Data

US 2014/0344791 A1  Nov. 20, 2014

(51) Int. Cl.
*G06F 9/45*  (2006.01)

(52) U.S. Cl.
CPC .............. *G06F 8/4434* (2013.01); *G06F 8/441* (2013.01); *G06F 8/443* (2013.01)

(58) Field of Classification Search
CPC ....... G06F 8/443; G06F 8/447; G06F 8/4434; G06F 8/4441; G06F 8/4435
See application file for complete search history.

(56) References Cited

U.S. PATENT DOCUMENTS

| 6,064,819 | A  | * | 5/2000  | Franssen et al. ............... 717/156 |
| 7,278,137 | B1 | * | 10/2007 | Fuhler et al. ................... 717/153 |
| 8,661,422 | B2 | * | 2/2014  | Lethin et al. ................... 717/151 |
| 2006/0070047 | A1 | * | 3/2006 | Narayanasamy et al. .... 717/144 |
| 2011/0055819 | A1 | * | 3/2011 | Doyle et al. ................... 717/156 |
| 2012/0159459 | A1 | * | 6/2012 | Turner et al. ................... 717/138 |
| 2012/0265972 | A1 |   | 10/2012 | Zwartenkot et al. |

FOREIGN PATENT DOCUMENTS

| TW | 505853 | 10/2002 |
| TW | 200947343 | 11/2009 |
| TW | 201246064 | 11/2012 |

OTHER PUBLICATIONS

Dreweke et al. Graph-Based Procedural Abstraction.International Symposium on Code Generation and Optimization, 2007. CGO '07. Mar. 2007, pp. 259-270. Retrieved on [Jun. 25, 2015] Retrieved from the Internet: URL<http://ieeexplore.ieee.org/stamp/stamp.jsp?tp=&arnumber=4145120>.*

(Continued)

*Primary Examiner* — Thuy Dao
*Assistant Examiner* — Cheneca Smith
(74) *Attorney, Agent, or Firm* — WPAT, P. C.; Anthony King

(57) ABSTRACT

A method for code size reduction, which comprises determining basic blocks in an IR module; grouping the basic blocks having duplicate code into groups; providing weighting values corresponding to different instructions of the module, wherein the weighting values are determined based on a plurality of intermediate representation program codes; determining a weighted size of the module, wherein the weighted size of the module is determined by summing weighted sizes of the basic blocks of the module, and the weighted size of each basic block is determined by summing products of numbers of different instructions of the basic blocks and the corresponding weighting values; removing duplicates in one group to obtain a module having one processed group; determining a weighted size of the module having one processed group; and comparing the weighted size of the module to the weighted size of the module having one processed group.

10 Claims, 3 Drawing Sheets

(56) References Cited

OTHER PUBLICATIONS

Swadi et al. "A monadic approach for avoiding code duplication when staging memoized functions." Proceedings of the 2006 ACM SIGPLAN symposium on Partial evaluation and semantics-based program manipulation. ACM, 2006. Retrieved on [Jun. 25, 2015] Retrieved from the Internet: URL <http://dl.acm.org/citation.cfm?id=1111570>.*

Office Action and Search Report dated May 25, 2015 from the Taiwan counterpart application 102123131.
English abstract translation of the Office Action dated May 25, 2015 from the Taiwan counterpart application 102123131.
English abstract translation of TW 201246064.
English abstract translation of TW 200947343.
English abstract translation of TW 505853.

* cited by examiner

METHOD AND APPARATUS FOR CODE SIZE REDUCTION

BACKGROUND

1. Technical Field

The present invention relates to a method and apparatus for code size reduction.

2. Related Art

In computer science, program optimization or software optimization is a process of modifying a software program to work more efficiently or use fewer resources. Normally, after being optimized, a computer program can execute commands more rapidly, operate with less memory storage or other resources, or consume less power.

A compiler is a computer program that transforms a source code written in a high-level computer language into a low-level computer language. Usually, a compiler comprises three main parts: the front-end, the middle-end, and the back-end. The front-end parses a text-based programming language into an intermediate representation (IR) of the source code for the middle-end; the middle-end performs optimizations on the IR and generates another IR for the back-end; and the back-end translates the IR from the middle-end into an assembly code.

Many compiler optimization techniques have been developed to reduce the size of generated codes, and one such technique is known as procedural abstraction. Procedural abstraction identifies repeated segments of code, and then extracts the repeated segments of code to construct a subroutine and replace other repeated segments by procedural calls to the newly created subroutine. As a result, the size of the code can be reduced.

Conventional procedural abstraction techniques are not perfect. In some circumstances, code size reduction between a non-optimized IR code and an optimized IR code is greater than that between the object code generated from a non-optimized IR code and the object code generated from an optimized IR code.

SUMMARY

One embodiment provides a method for code size reduction, which comprises determining basic blocks in an intermediate representation module; grouping those of the basic blocks having duplicate code into groups; providing weighting values corresponding to different instructions of the module, wherein the weighting values are determined based on a plurality of intermediate representation program codes; determining a weighted size of the module, wherein the weighted size of the module is determined by summing weighted sizes of the basic blocks of the module, and the weighted size of each basic block is determined by summing products of numbers of different instructions of the basic blocks and the corresponding weighting values; removing duplicates in one of the groups of the module to obtain a module having one processed group; determining a weighted size of the module having one processed group, wherein the weighted size of the module having one processed group is determined by summing weighted sizes of the basic blocks of the module having one processed group, and the weighted size of each basic block is determined by summing products of numbers of different instructions of the basic blocks of the module having one processed group and the corresponding weighting values; and comparing the weighted size of the module to the weighted size of the module having one processed group.

One embodiment of the present invention comprises an apparatus for code size reduction. The apparatus can comprise a computer processor and a procedural extraction mechanism operated on the computer processor. The procedural extraction mechanism is used to determine basic blocks in an intermediate representation module, group those of the basic blocks having duplicate code into groups, provide weighting values corresponding to different instructions of the module, determine a weighted size of the module, remove duplicates in one of the groups of the module to obtain a module having one processed group, determine a weighted size of the module having one processed group, and compare the weighted size of the module to the weighted size of the module having one processed group. The weighted size of the module having one processed group is determined by summing weighted sizes of the basic blocks of the module having one processed group, and the weighted size of each basic block is determined by summing products of numbers of different instructions of the basic blocks of the module having one processed group and the corresponding weighting values. The weighted size of the module is determined by summing weighted sizes of the basic blocks of the module, and the weighted size of each basic block is determined by summing products of numbers of different instructions of the basic blocks and the corresponding weighting values. The weighting values are determined based on a plurality of intermediate representation program codes.

To better understand the above-described objectives, characteristics and advantages of the present invention, embodiments, with reference to the drawings, are provided for detailed explanations.

BRIEF DESCRIPTION OF THE DRAWINGS

The invention will be described according to the appended drawings in which.

DETAILED DESCRIPTION OF DISCLOSED EMBODIMENTS

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

In some embodiments, a new method for code size reduction is disclosed. The new method is demonstrated using an LLVM (Low Level Virtual Machine) infrastructure. The new method is not limited to an LLVM infrastructure, and is applicable to any suitable compiler infrastructures. In some embodiments, the new method is applicable to a computer program, code, module, or the like, wherein a module may contain one or more functions, a function may comprise a plurality of basic blocks, and a basic block comprises a sequence of instructions. A basic block may have one entry point and one exit point. An instruction may be any representation of an element of an executable program, such as a bytecode. In some embodiments, a basic block may have a terminator instruction such as a branch or a function return.

A basic block can have a size. The size of the basic block can be represented by instruction counts or the number of instructions of the basic blocks. A module M may comprise a plurality of function ($function_1$), each of which may comprise a plurality of basic blocks $BB_m$; however, some are similar while others are not. The size, S(M), of the module M can be determined by the following equation (1):

$$S(M) = \sum_{\forall function_i \in M} \sum_{\forall BB_m \in function_i} InstCnt(BB_m) \quad (1)$$

The equation (1) can be utilized to evaluate the effect of performing procedural abstraction, or procedural extraction, to extract a group of a module including similar basic blocks. The equation (1) is initially used to determine the size $S(M_{orig})$ of the original module, and then to determine the size $S(M_{extract})$ of the module that has a group whose basic blocks' duplicates are removed. If the size $S(M_{extract})$ is less than the size $S(M_{orig})$, the removal of the duplicates in the group can be considered as being helpful in the optimization of the module.

Figure 1:
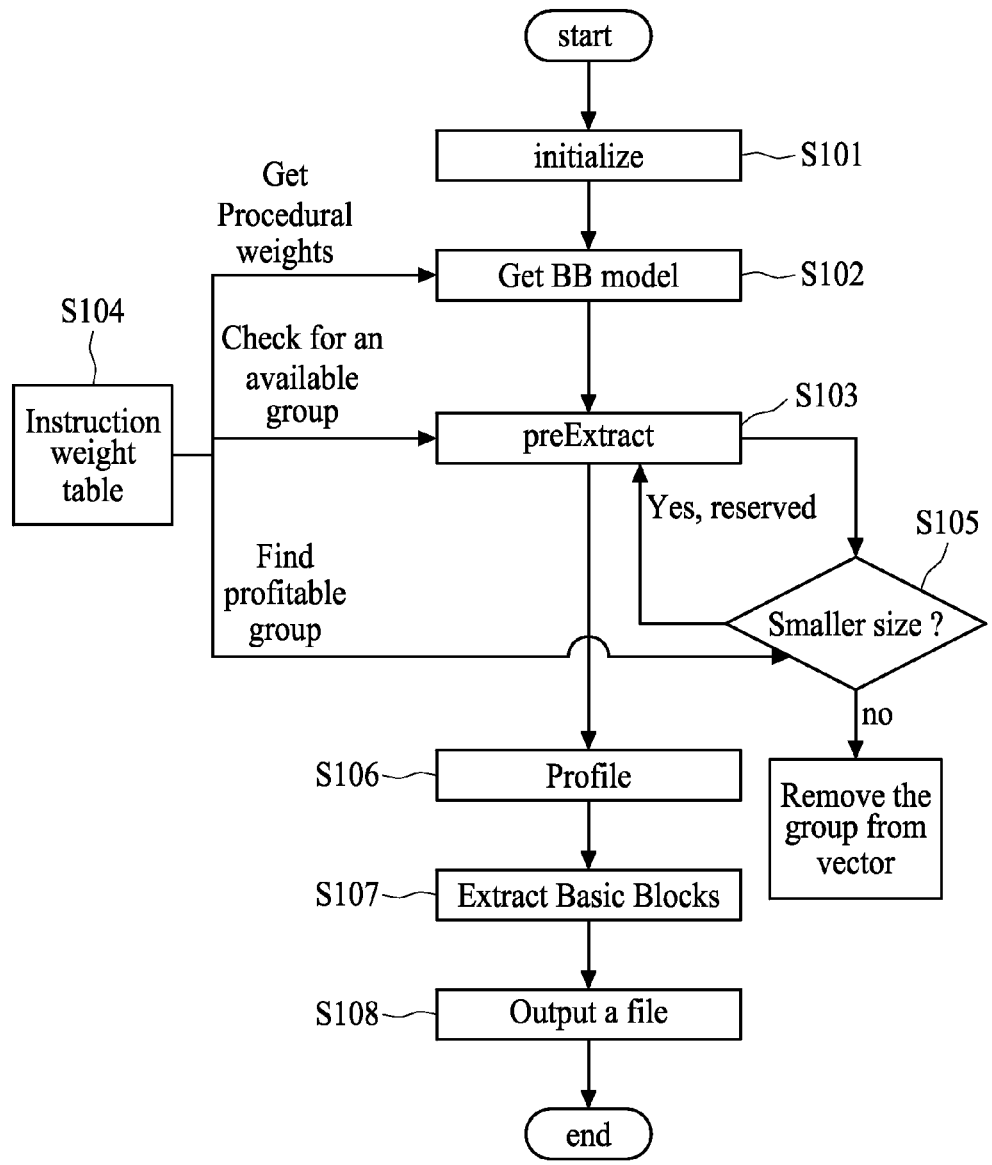
FIG. 1 is a flowchart showing the steps of a method for code size reduction according to one embodiment of the present invention.

FIG. 1 is a flowchart showing the steps of a method for code size reduction according to one embodiment of the present invention. Table 1 below illustrates a pseudo code implementing the steps of the method for code size reduction set forth in the flowchart of FIG. 1.

TABLE 1

| line | Procedural abstraction algorithm |
|---|---|
|  | M is a LLVM Module; Prof is a profiling message of a hot-spot basic block |
| 1 | select a basic block $BB_x$ for comparison |
| 2 | for basic block $BB_y$ in module M do |
| 3 |   if $BB_x$ is equal to $BB_y$ then |
| 4 |     if $BB_x$ is not in any group then |
| 5 |       push $BB_x$ into vector V and mark $BB_x$ with group $GP_i$ |
| 6 |       push $BB_y$ into vector V and mark $BB_y$ with group $GP_i$ |
| 7 |     else |
| 8 |       push $BB_y$ into vector V and mark $BB_y$ with group $GP_i$ |
| 9 |     end if |
| 10 |   end if |
| 11 | end for |
| 12 | calculate weighted size W(M) |
| 13 | for Group $GP_i$ in V do |
| 14 |   copy Module M to another Module $M_1$ |
| 15 |   extract the corresponding members (basic blocks) of $GP_i$ from $M_1$ |
| 16 |   calculate weighted size $W(M_1)$ |
| 17 |   if $W(M_1) > W(M)$ then |
| 18 |     remove members of $GP_i$ from V |
| 19 |   end if |
| 20 | end for |
| 21 | for $BB_i$ in V do |
| 22 |   if $BB_i$ is a hot-spot region in Prof then |
| 23 |     remove $BB_i$ from V |
| 24 |   end if |
| 25 | end for |
| 26 | Reorganize V |
| 27 | for $BB_i$ in $GP_k$ in V do |
| 28 |   extract $BB_i$ from M |
| 29 | end for |
| 30 | output M as a transformed file |

Referring to FIG. 1 and Table 1, in Step S101, the method performs initialization.

In Step S102, the method determines the basic blocks of the module. In one embodiment, the module is an intermediate representation (IR) module. Next, as also shown in lines 2 to 11 of Table 1, the method iteratively traverses all basic blocks of the module to determine basic blocks with duplicate code, and then classifies the basic blocks with duplicate code into the same group. Each classified basic block can be pushed into a vector V. This step continues until all basic blocks are classified.

Figure 2A:
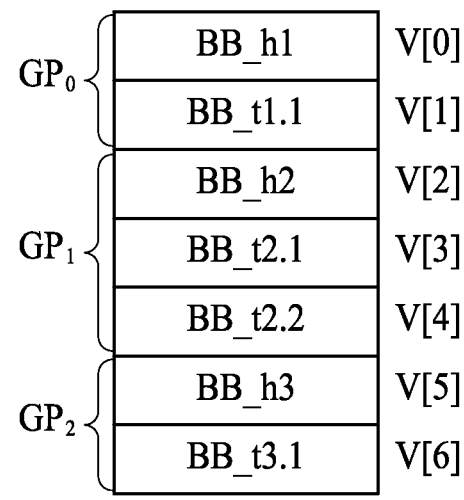
FIG. 2A illustrates a vector comprising grouped basic blocks according to one embodiment of the present invention.

For example, as shown in FIG. 2A, the method initially selects a basic block BB_h1 for comparison, and then compares the basic block BB_h1 with other basic blocks (BB_h2, BB_h3, BB_t1.1, BB_t2.1, BB_t2.2, BB_t3.1). Next, the method determines that the basic block BB_t1.1 includes duplicate code, and then determines that the basic block BB_h1 does not belong to a group yet. Thereafter, the basic block BB_h1 and the basic block BB_t1.1 are pushed into a vector V respectively as the first element v[0] and the second element v[1] of the vector V, and classified into group $GP_0$. After all basic blocks are examined, the method selects another basic block BB_h2 for comparison. Similarly, after the basic block BB_t2.1 is identified as having duplicate code, the basic block BB_h2 and the basic block BB_t2.1 are pushed into a vector V, and classified into a new group $GP_1$. When the method further identifies a basic block BB_t2.2 having the same duplicate code, the basic block BB_t2.2 is pushed into the vector V and classified into the new group $GP_1$. After all remaining basic blocks are examined, the method selects another basic block BB_h3, and compares the basic block BB_h3 with other remaining basic blocks. The selection and comparison steps continue until all basic blocks are classified.

Referring to FIG. 1 and lines 12-20 of Table 1, in Step S103, which is a prep-extract step, the module comprises a plurality of instructions, and the method provides a plurality of weighting values corresponding to different instructions of the module. In one embodiment, the plurality of weighting values can be selected from an instruction weight table (S104), and at least one weighting value is not equal to one.

Next, the method uses the following equation (2) to multiply the numbers of different instructions ($Instr_k$) of each basic block of the module by corresponding weighting values, and sums the products to obtain a weighted size of the basic block and to sum the weighted sizes of the basic blocks of the module to obtain the weighted size (W(M)) of the module.

$$W(M) = \sum_{\forall function_i \in M} \sum_{\forall BB_m \in function_i} \sum_{\forall Instr_k \in BB_m} W(Instr_k) \quad (2)$$

Subsequently, the method creates another module $M_1$ by making a copy of the module M. The method then selects a group of basic blocks of the module $M_1$ and removes or eliminates the duplicates in the group. Next, the method uses the equation (2) to multiply the numbers of different instructions (Instr$_k$) of each basic block of the module M$_1$ by correspondingweighting values, and sums the products to obtain a weighted size of the basic block and to sum the weighted sizes of the basic blocks of the module M$_1$ to obtain the weighted size W(M$_1$) of the module M$_1$. In Step S105, the methods compare the weighted size W(M) with the weighted size W(M$_1$) to determine whether such a removal of duplicates in the group can create more benefit than cost. If the removal of duplicates in a group creates more benefit, the group will be left in the vector, and it and other remaining groups will be extracted in a later optimization process.

In one embodiment, in each cost-benefit analysis, only one group of basic blocks are extracted or processed.

Figure 2B:
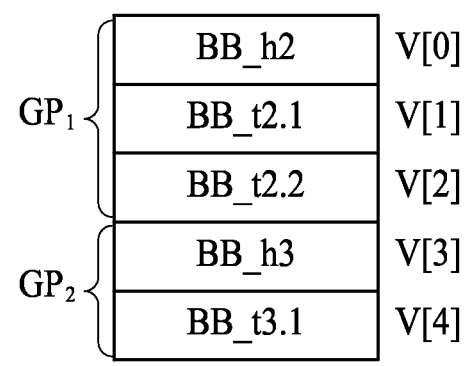
FIG. 2B illustrates another vector, in which a group of basic blocks are removed according to one embodiment of the present invention.

For example, in the embodiments of FIGS. 2A and 2B, the duplicates of the group Gp$_0$ are eliminated. Because the weighted size W(M$_1$), is greater than the weighted size W(M), the group Gp$_0$ is removed from the vector V so that the group Gp$_0$ will not be extracted in a later optimization process, and a significant performance gain can be ensured.

As shown in FIGS. 2A and 2B, after the group Gp$_0$ is processed, the basic blocks of the group Gp$_1$ are extracted, and another weighted size W(M$_1$) is calculated and compared with the weighted size W(M). Because another weighted size W(M$_1$) is less than the weighted size W(M), the group Gp$_1$ is left in the vector V. Similarly, the group Gp$_2$ having a weighted size smaller than the weighted size W(M) is left in the vector V. Finally, the module M is optimized with the basic blocks of the remaining groups Gp$_1$ and Gp$_2$ being extracted.

Referring to FIG. 1 and lines 21 to 25 of Table 1, in Step S106, after all groups are processed, the method uses a profiler to check whether the remaining basic blocks include a hot spot. Once a hot spot has been identified, the method will remove the basic block including the hot spot.

Referring to FIG. 1 and lines 27 to 30 of Table 1, in Steps S107 and S108, the method optimizes the module M, during which the method only extracts the basic blocks of the remaining groups in the vector V to generate or output a transformed file or code.

The following demonstrates the generation of the instruction weight table, while the present invention is not limited to such a disclosure.

A plurality of IR (intermediate representation) program codes of number i are provided. The program code may comprise a library, a benchmark program, a function of a benchmark program, a function, or an optimized IR program. Next, a plurality of parameters (x$_j$) are used to correspondingly represent IR (intermediate representation) instructions. The parameters (x$_j$) can be organized into a vector as shown below.

$$\vec{x} = \begin{bmatrix} x_1 \\ x_2 \\ \vdots \\ x_n \end{bmatrix} \quad (3)$$

Each IR program code is iteratively examined to count the number of each IR instruction until all IR instructions are exhausted. Thereafter, a set of equations can be obtained.

$$\sum_{j=1}^{n} a_{i,j} \times x_j = b_i, \quad (4)$$

where i denotes an index between one and n, j denotes an index between 1 and m, n is an integer, m is an integer and may be equal to n, a$_{i,j}$ represents the numbers of instruction j in the i$^{th}$ IR program code, and b$_i$ represents the code size of the compiled i$^{th}$ IR program code.

The set of equations can be converted into a matrix equation (5), $M\vec{x}=\vec{b}$.

$$\begin{bmatrix} a_{11} & a_{12} & \cdots & a_{1n} \\ a_{21} & a_{22} & \cdots & a_{2n} \\ \vdots & \vdots & \vdots & \vdots \\ a_{m1} & a_{m2} & \cdots & a_{mn} \end{bmatrix} \begin{bmatrix} x_1 \\ x_2 \\ \vdots \\ x_n \end{bmatrix} = \begin{bmatrix} b_1 \\ b_2 \\ \vdots \\ b_m \end{bmatrix} \quad (5)$$

An approximate vector $\vec{x}$ can be obtained by solving the equation (5), and each element of the vector $\vec{x}$ represents an estimate of the corresponding IR instruction, which can be used as a weighting value.

In one embodiment, the vector $\vec{x}$ is determined by calculating a generalized inverse or pseudo-inverse of the matrix M. In one embodiment, the vector $\vec{x}$ is calculated by a constrained least squares method. In one embodiment, the elements of the vector $\vec{x}$ are constrained between 5 and 35.

Figure 3:
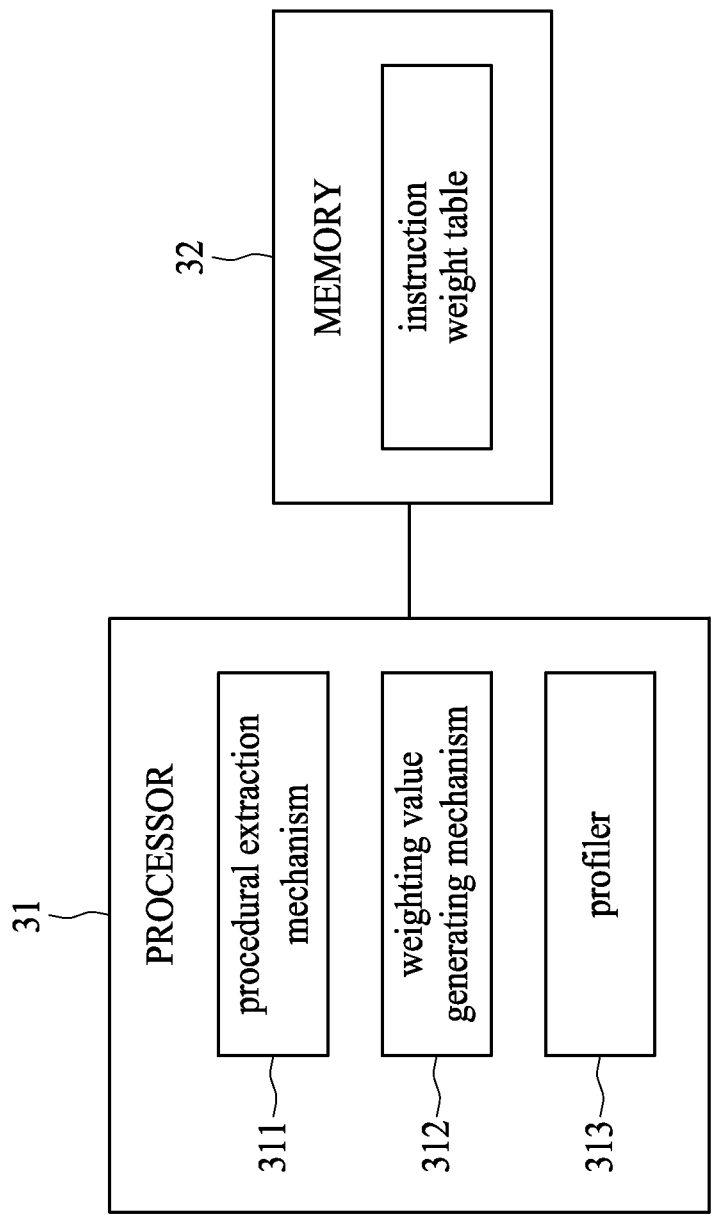
FIG. 3 schematically shows an apparatus for code size reduction according to one embodiment of the present invention.

FIG. 3 schematically shows an apparatus for code size reduction according to one embodiment of the present invention. Referring to FIG. 3, the apparatus 3 comprises a computer processor 31. A procedural extraction mechanism 311 can be operated on the computer processor 31. The procedural extraction mechanism 311 is used to a) determine basic blocks in an intermediate representation module, b) group those of the basic blocks having duplicate code into groups, c) provide weighting values corresponding to different instructions of the module and including at least one being not equal to one, d) determine a weighted size of the module, e) remove duplicates in one of the groups of the module to obtain a module having one processed group, f) determine a weighted size of the module having one processed group, and g) compare the weighted size of the module to the weighted size of the module having one processed group. Moreover, the procedural extraction mechanism 311 can be further used to h) remove the one of the groups if the weighted size of the module having one processed group is greater than the weighted size of the module. Moreover, the procedural extraction mechanism 311 can be further used to repeat step e) to step h) until all groups are processed and to remove duplicates in the remaining groups.

In one embodiment, the weighting values can be determined based on a plurality of intermediate representation program codes. In one embodiment, the weighting values can be determined based on a plurality of intermediate representation program codes and sizes thereof. In one embodiment, the weighting values can be determined based on a plurality of intermediate representation program codes, the number of the intermediate representation instructions of each intermediate representation program code, and the size of each intermediate representation program code.

As shown in FIG. 3, a profiler 313 can be operated on the computer processor 31 to remove any of the remaining basic blocks, including a hot spot before the step of removing duplicates in the remaining groups.

In addition, a weighting value generating mechanism 312 is operated on the computer processor 31 to provide a plurality of intermediate representation program codes of number i;

provide a plurality of parameters $(x_j)$ corresponding to all intermediate representation instructions of an intermediate language; count a number $(a_{i,j})$ of each intermediate representation instruction used in each intermediate representation program code; compile each IR program code of the plurality of intermediate representation program codes to an object code; determine a size $(b_i)$ of each object code; and determine the plurality of parameters $(x_j)$ by the following equation, $$\sum_{j=1}^{n} a_{i,j} \times x_j = b_i,$$

where n is an integer.

The apparatus 3 can comprise a memory 32, which can be disposed with the same system, including the processor 31, or can remotely communicate with the processor 31. The memory 32 can store an instruction weight table, which can be formed according to the above plurality of parameters $(x_j)$. The computer processor 31 can select required weighting values from the instruction weight table.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

It will be apparent to those skilled in the art that various modifications and variations can be made to the disclosed embodiments. It is intended that the specification and examples be considered as exemplary only, with a true scope of the disclosure being indicated by the following claims and their equivalent.

What is claimed is:

1. A method for code size reduction executed by a processor, comprising the steps of:
   a) determining basic blocks in an intermediate representation module;
   b) grouping ones of the basic blocks having duplicate code into groups;
   c) providing weighting values corresponding to different instructions of the module, wherein the weighting values are determined based on a plurality of intermediate representation program codes of number i, wherein i is an integer greater than 0;
   d) determining a weighted size of the module, wherein the weighted size of the module is determined by summing weighted sizes of the basic blocks of the module, and the weighted size of each basic block is determined by summing products of numbers of different instructions of the basic blocks and the corresponding weighting values;
   e) removing duplicates in one of the groups of the module to obtain a module having one processed group;
   f) determining a weighted size of the module having one processed group, wherein the weighted size of the module having one processed group is determined by summing weighted sizes of the basic blocks of the module having one processed group, and the weighted size of each basic block is determined by summing products of numbers of different instructions of the basic blocks of the module having one processed group and the corresponding weighting values; and
   g) comparing the weighted size of the module to the weighted size of the module having one processed group.

2. The method of claim 1, further comprising a step of:
   h) removing the one of the groups if the weighted size of the module having one processed group is greater than the weighted size of the module.

3. The method of claim 2, further comprising the steps of:
   repeating step e) to step h) until all groups are processed; and
   removing duplicates in remaining groups.

4. The method of claim 3, further comprising a step of removing any remaining basic blocks, including a hot spot, before the step of removing duplicates in remaining groups.

5. The method of claim 1, further comprising the steps of:
   providing the plurality of intermediate representation program codes of number i;
   providing a plurality of parameters $(x_j)$ corresponding to all intermediate representation instructions, wherein j is an integer greater than 0;
   counting a number $(a_{i,j})$ of each intermediate representation instruction used in each intermediate representation program code;
   compiling each intermediate representation program code of the plurality of intermediate representation program codes to an object code;
   determining a size $(b_i)$ of each object code; and
   solving the following equation for the plurality of parameters $(x_j)$, $$\sum_{j=1}^{n} a_{i,j} \times x_j = b_i,$$

where n is an integer;
wherein the weighting values are selected from the parameters $(x_j)$.

6. An apparatus for code size reduction, comprising:
   a computer processor; and
   a procedural extraction mechanism operated on the computer processor, wherein the procedural extraction mechanism is used to:
   a) determine basic blocks in an intermediate representation module;

b) group ones of the basic blocks having duplicate code into groups;
c) provide weighting values corresponding to different instructions of the module;
d) determine a weighted size of the module;
e) remove duplicates in one of the groups of the module to obtain a module having one processed group;
f) determine a weighted size of the module having one processed group; and
g) compare the weighted size of the module and the weighted size of the module having one processed group;

wherein the weighting values are determined based on a plurality of intermediate representation program codes of number i, wherein i is an integer greater than 0;

wherein the weighted size of the module is determined by summing weighted sizes of the basic blocks of the module, and the weighted size of each basic block is determined by summing products of numbers of different instructions of the basic blocks and the corresponding weighting values;

wherein the weighted size of the module having one processed group is determined by summing weighted sizes of the basic blocks of the module having one processed group, and the weighted size of each basic block is determined by summing products of numbers of different instructions of the basic blocks of the module having one processed group and the corresponding weighting values.

7. The apparatus of claim 6, further comprising the procedural extraction mechanism used to h) remove the one of the groups if the weighted size of the module having one processed group is greater than the weighted size of the module.

8. The apparatus of claim 7, further comprising the procedural extraction mechanism used to repeat step e) to step h) until all groups are processed; and to remove duplicates in remaining groups.

9. The apparatus of claim 8, further comprising a profiler used to remove any remaining basic blocks, including a hot spot, before the step of removing duplicates in remaining groups.

10. The apparatus of claim 6, further comprising a weighting value generating mechanism used to:
provide the plurality of intermediate representation program codes of number i;
provide a plurality of parameters ($x_j$) corresponding to all intermediate representation instructions, wherein j is an integer greater than 0;
count a number ($a_{i,j}$) of each intermediate representation instruction used in each intermediate representation program code;
compile each intermediate representation program code of the plurality of intermediate representation program codes to an object code;
determine a size ($b_i$) of each object code; and
solve the following equation for the plurality of parameters ($x_j$), $$\sum_{j=1}^{n} a_{i,j} \times x_j = b_i,$$

where n is an integer;
wherein the weighting values are selected from the parameters ($x_j$).

* * * * *